(12) United States Patent
Cho et al.

(10) Patent No.: US 8,154,617 B2
(45) Date of Patent: Apr. 10, 2012

(54) METHOD OF DETECTING THE EXISTENCE OF VISUALLY SENSITIVE THIN LINES IN A DIGITAL IMAGE

(75) Inventors: Yushin Cho, Sunnyvale, CA (US); Daisuke Hiranaka, Kawasaki (JP); Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 372 days.

(21) Appl. No.: 12/571,070

(22) Filed: Sep. 30, 2009

(65) Prior Publication Data

US 2011/0074976 A1 Mar. 31, 2011

(51) Int. Cl.
*H04N 5/228* (2006.01)
*H04N 7/12* (2006.01)
*G06K 9/36* (2006.01)

(52) U.S. Cl. .................... 348/222.1; 348/397.1; 382/232

(58) Field of Classification Search ................ 348/222.1, 348/207.99, 393.1, 397.1, 398.1, 420.1, 241, 348/251, 252; 382/232, 242, 243; 358/448
See application file for complete search history.

(56) References Cited

U.S. PATENT DOCUMENTS

| | | | |
|---|---|---|---|
| 6,847,738 B1 | 1/2005 | Scognamiglio et al. | |
| 2005/0140664 A1* | 6/2005 | Kawamura et al. | 345/204 |
| 2005/0265624 A1* | 12/2005 | Washio | 382/273 |
| 2006/0072038 A1* | 4/2006 | Wyman | 348/448 |
| 2009/0097776 A1* | 4/2009 | Fukamachi et al. | 382/269 |
| 2009/0161969 A1* | 6/2009 | Hara | 382/232 |
| 2010/0310170 A1* | 12/2010 | Li et al. | 382/224 |

FOREIGN PATENT DOCUMENTS

JP 200736560 A2 2/2007

OTHER PUBLICATIONS

"Datum Point Determination," Chapter 6.2, pp. 114-116, Automated Biometrics, 2000, Klumer Academic Publishers.
A. Hendry et al., "Automated Linear Feature Detection and Its Application to Curve Location in Synthetic Aperture Radar Imagery", pp. 1521-1524, Proceedings of IGARSS '88 Symposium, Edinburgh, Scotland, Sep. 13-16, 1988, Ref. ESA SP-284 (IEEE 88CH2497-6), Published by ESA Publications Division, Aug. 1988.

* cited by examiner

*Primary Examiner* — Nhan T Tran
(74) *Attorney, Agent, or Firm* — Haverstock & Owens LLP

(57) ABSTRACT

A method of detecting existence of visually thin lines in images is described herein. The method includes profile generation, profile analysis and deciding the existence of thin lines. The profile generation includes generating a profile in each direction of the input image. Multiple projection lines are projected along the direction and all of the pixel values along the projection lines are added and averaged to obtain a profile. The profile analysis includes determining presence of thin lines in the input image and also noticing if the direction of the thin lines is similar to that of the projection lines. At the third step, according to the analysis made, existence of thin lines in the image is decided.

17 Claims, 4 Drawing Sheets

METHOD OF DETECTING THE EXISTENCE OF VISUALLY SENSITIVE THIN LINES IN A DIGITAL IMAGE

FIELD OF THE INVENTION

The present invention relates to the field of image/video processing. More specifically, the present invention relates to detection of thin lines and image/video compression.

BACKGROUND OF THE INVENTION

When displaying an image or a video there is a minimum amount of bits needed to be able to display the image/video without a degradation in quality. Since thin lines are visually sensitive to human eyes, and if less number of bits than required are allocated, the image quality is degraded and human eyes will perceive the degradation.

In order to detect visually sensitive parts of an image, previous methods have attempted to detect the existence of edges. However, edge information is difficult to detect for thin lines, and they are almost impossible to obtain if the lines and their backgrounds do not have significant pixel value differences. Also, edge-based detection suffers from vulnerability to noise and other image content in the background.

SUMMARY OF THE INVENTION

A method of detecting existence of visually thin lines in images is described herein. The method includes profile generation, profile analysis and deciding the existence of thin lines. The profile generation includes generating a profile in each direction of the input image. Multiple projection lines are projected along the direction and all of the pixel values along the projection lines are added and averaged to obtain a profile. The profile analysis includes determining presence of thin lines in the input image and also noticing if the direction of the thin lines is similar to that of the projection lines. At the third step, according to the analysis made, existence of thin lines in the image is decided.

In one aspect, a method of detecting substantially parallel thin lines in an image implemented on a device comprises generating a profile using a processor and analyzing the profile using the processor to determine whether the thin lines exist. The profile is generated for each of a pre-defined plurality of directions. Multiple projection lines are used for each direction of the plurality of directions. The method further comprises determining a sum of the pixel values along the projection line and averaging the sum to generate a result for each projection line of the multiple projection lines. The result is stored in any one of an array, a linked list and a table. Analyzing the profile further comprises computing gradients for each result and determining sign changes of the gradients. Analyzing the profile further comprises computing gradients for each result and determining a difference value between each adjacent peak and bottom. If an amount of the sign changes is greater than a first threshold and if the difference value is greater than a second threshold, then the thin lines are determined to exist. The method further comprises sending a decision to a rate controller which allocates additional bits for encoding the portion of the image when the thin lines are detected. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

In another aspect, a method of encoding an image implemented on a device comprises detecting substantially parallel lines in a portion of the image using a processor and allocating additional bits when the substantially parallel lines are detected using the processor. Detecting the lines further comprises generating a profile for each of a pre-defined plurality of directions; wherein multiple projection lines are used for each direction of the plurality of directions, determining a sum of the pixel values along the projection line and averaging the sum to generate a result for each projection line of the multiple projection lines and computing gradients for each result and determining sign changes of the gradients or determining a difference value between each adjacent peak and bottom, and if the difference value is greater than a first threshold, then the thin lines are determined to exist or if an amount of the sign changes is greater than a second threshold, the thin lines are determined to exist. The method further comprises sending a decision to a rate controller which allocates the additional bits for encoding the portion of the image when the lines are detected. The result is stored in any one of an array, a linked list and a table. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

In yet another aspect, a system for encoding an image programmed in a memory on a device comprises a profile generation module for generating a profile for each of a pre-defined plurality of directions using a processor, wherein multiple projection lines are used for each direction of the plurality of directions, a profile analysis module for analyzing the profile by determining a sum of the pixel values along the projection line and averaging the sum to generate a result for each projection line of the multiple projection lines and computing gradients for each result and determining sign changes of the gradients and determining a difference value between each adjacent peak and bottom and a decision module for deciding if the difference value is greater than a first threshold, then thin lines are determined to exist or if an amount of the sign changes is greater than a second threshold, the thin lines are determined to exist. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

In yet another aspect, a device comprises a memory for storing an application, the application for generating a profile and analyzing the profile to determine whether the thin lines exist and a processing component coupled to the memory, the processing component configured for processing the application. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

In another aspect, a camera device comprises an image acquisition component for acquiring an image, a codec for encoding the image by detecting substantially parallel thin lines in a portion of an image and allocating additional bits for the portion of the image when substantially parallel thin lines are detected when compressing the image into a compressed image and a memory for storing the compressed image.

DETAILED DESCRIPTION OF THE PREFERRED EMBODIMENT

In image and video compression, human viewers are very sensitive to a group of thin straight lines in decoded images. Even a small quality drop is easily noticed by human eyes. If image and video compressors (e.g. a codec) are able to detect which area of the image contains the visually sensitive thin lines, the compressors are able to protect the image quality accordingly.

The existence of visually sensitive thin lines in areas of an input image are able to be detected by generating and analyzing the image pixel values along multiple directions, enabling the image and/or video compressor to decide whether the image quality of the specific image area should be protected by using finer quantization or other coding modes.

Figure 1:
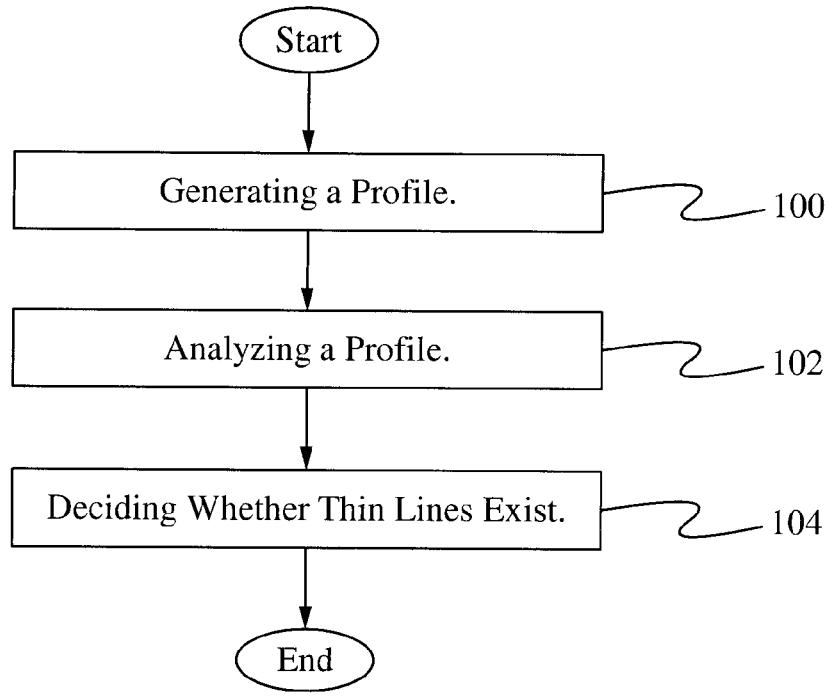
FIG. 1 illustrates a flowchart of a method of determining if an image includes a set of thin lines in the same direction, according to some embodiments.

FIG. 1 illustrates a flowchart of a method of determining if an image includes a set of thin lines in the same or at least substantially the same direction (e.g. parallel), according to some embodiments. In the step 100, a profile is generated for each direction of the input image or section of the image (e.g. macroblock). The number of directions is able to be predefined. For a certain direction, there are multiple projection lines along that direction. The pixel values on the projection line are summed together (and in some embodiments, averaged) and a resulting value is obtained. Since there are multiple projection lines along one direction, a profile (e.g. a histogram) is able to be generated for each direction. Further, since the profile is generated over many pixels, it is less vulnerable to noise and other image content (e.g. texture) in the background. In the step 102, the profile is analyzed. It is determined if there are thin lines existing in the image area and if the direction of the lines is similar to the direction of the projection line. If the profile shows a "peak-bottom-peak-bottom . . . " pattern, then thin lines in the same direction have been detected. In the step 104, a decision is made as to the existence of thin lines. In some embodiments, the decision is sent to a rate controller to take the appropriate action such as allocating more bits to an image segment that has thin lines. The process is able to be repeated for each image segment of an entire image or video.

Figure 2:
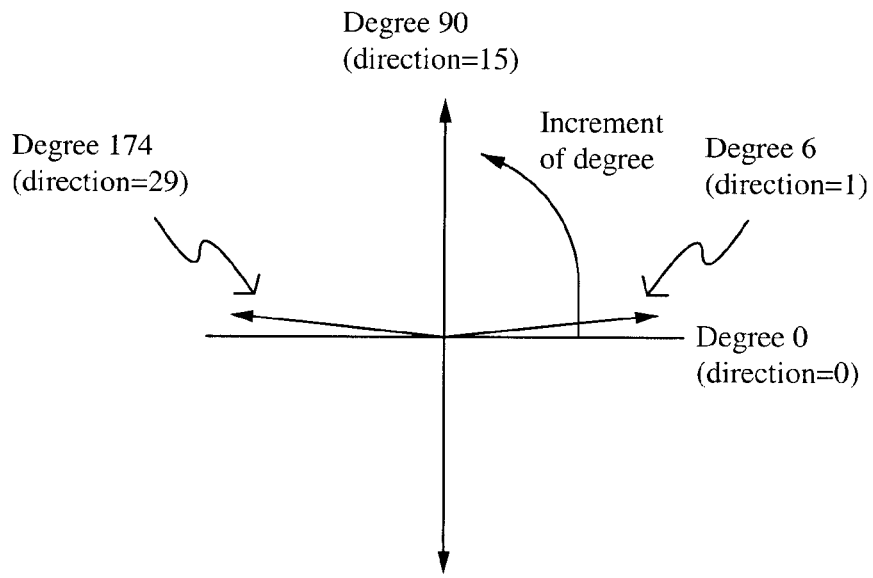
FIG. 2 illustrates a diagram of directions for thin line detection according to some embodiments.

FIG. 2 illustrates a diagram of directions for thin line detection according to some embodiments. To decide if weak lines exist in an image section, lines are attempted to be detected. For example, with a 16×16 pixel macroblock, the pixel values are projected along 30 directions. The degree is measured counterclockwise from a horizontal line as shown in FIG. 2. For 30 directions, one direction change increases or decreases 6 degrees. A $0^{th}$ direction is at 0°, a first direction is at 6°, a fifteenth direction is at 90° and a twenty-ninth direction is at 174°. Any number of directions are able to be used, and any number of direction angles are able to be used.

Example for 0° Case

Figure 3:
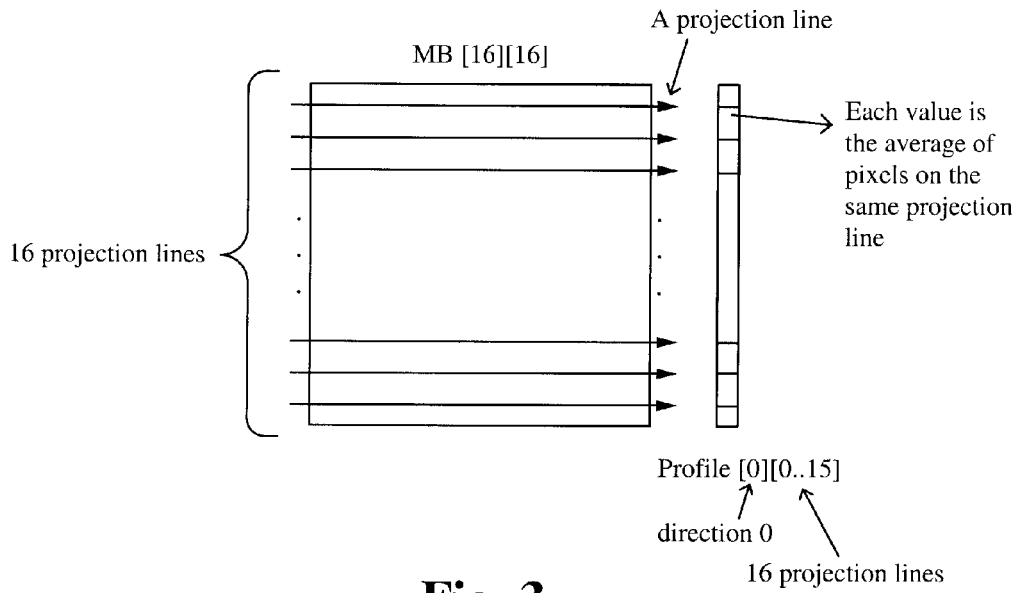
FIG. 3 illustrates a diagram of projection lines according to some embodiments.

FIG. 3 illustrates a diagram of projection lines according to some embodiments. For the 0° direction, 16 projection lines are used. However, another number of projection lines are able to be used. Additionally, other directions are able to use a different number of projection lines. Identification of corresponding projection lines of each pixel is straightforward for a 0° direction case. For other directions, a table is used to identify which projection line corresponds to each pixel. The projections are used to generate a profile. Thus, a profile is generated for each direction. The profile of each direction is then analyzed to detect the pattern of lines and decide if lines exist in the image section. The pixel values on one projection line are summed. In some embodiments, for optimization, every other pixel value or every $n^{th}$ pixel value is summed. Then, an average value of the sum is taken. This is repeated for each projection line, such that each value is an average of the pixels on the same projection line. This results in a profile for the 0° direction, where the profile includes 16 average values for the case. Profile[dir] is the profile for direction 'dir' (dir* 6 in degrees). The results are able to be stored in any data structure including, but not limited to, an array, a linked list or a table.

Example for 48° Case

Figure 4:
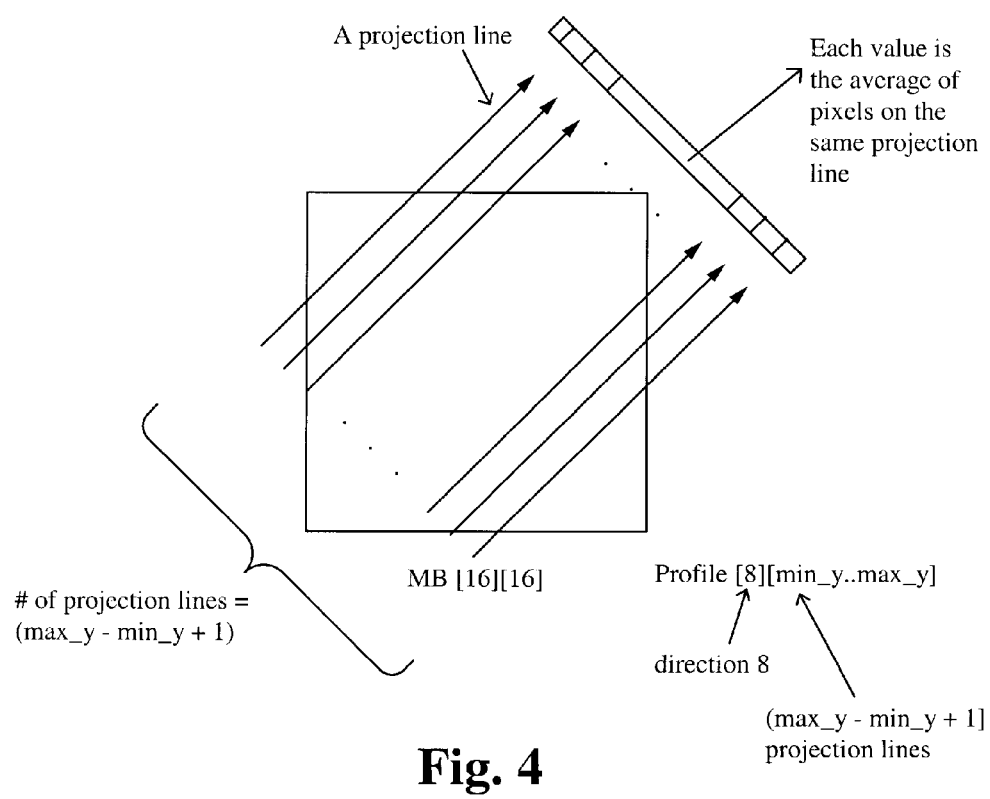
FIG. 4 illustrates a diagram of projection lines according to some embodiments.

FIG. 4 illustrates a diagram of projection lines according to some embodiments. For the 48° direction (direction=8), a table of values is used to identify the projection line for each pixel in the image section. For all 30 directions, there are 30 tables of values which are able to be used in the calculations. For direction 8, 22 projection lines are indexed by [−3 . . . 18]. That is, projection line '−3', . . . , projection line '18'. The index of a projection line is able to be negative to simplify the implementation. If 16×16 pixels in an image section are represented by pixel(y, x)=MB[16][16], then pixel(0,0), pixel(0, 1) and pixel(1,0) belong to the projection line '−3', and pixel (2,0), pixel(1,1) and pixel(0,2) belong to projection line '−2'. In this way, there are 22 projection lines, indexed from '−3' to '18'. The first and last index of available projection lines for each direction are stored in y_range[dir][0] and y_range[dir] [1]. For example, for direction=8) (48°, the first and last index '−3' and '18' are stored in y_range[8][0] and y_range[8][1]. As described above, each value stored in the profile is an average of the pixels on the same projection line.

Analyzing Profiles to Detect the Existence of Lines

To detect the existence of lines, peaks and bottoms are found in the profile data. For example, assuming a profile for 0° (direction=0), and the profile [0][ ]=92 90 88 92 91 95 91 102 111 104 102 100 98 103 and 98, shown as diamonds in FIG. 5. Each number is the mean of numbers projected along the same projection line.

Figure 5:
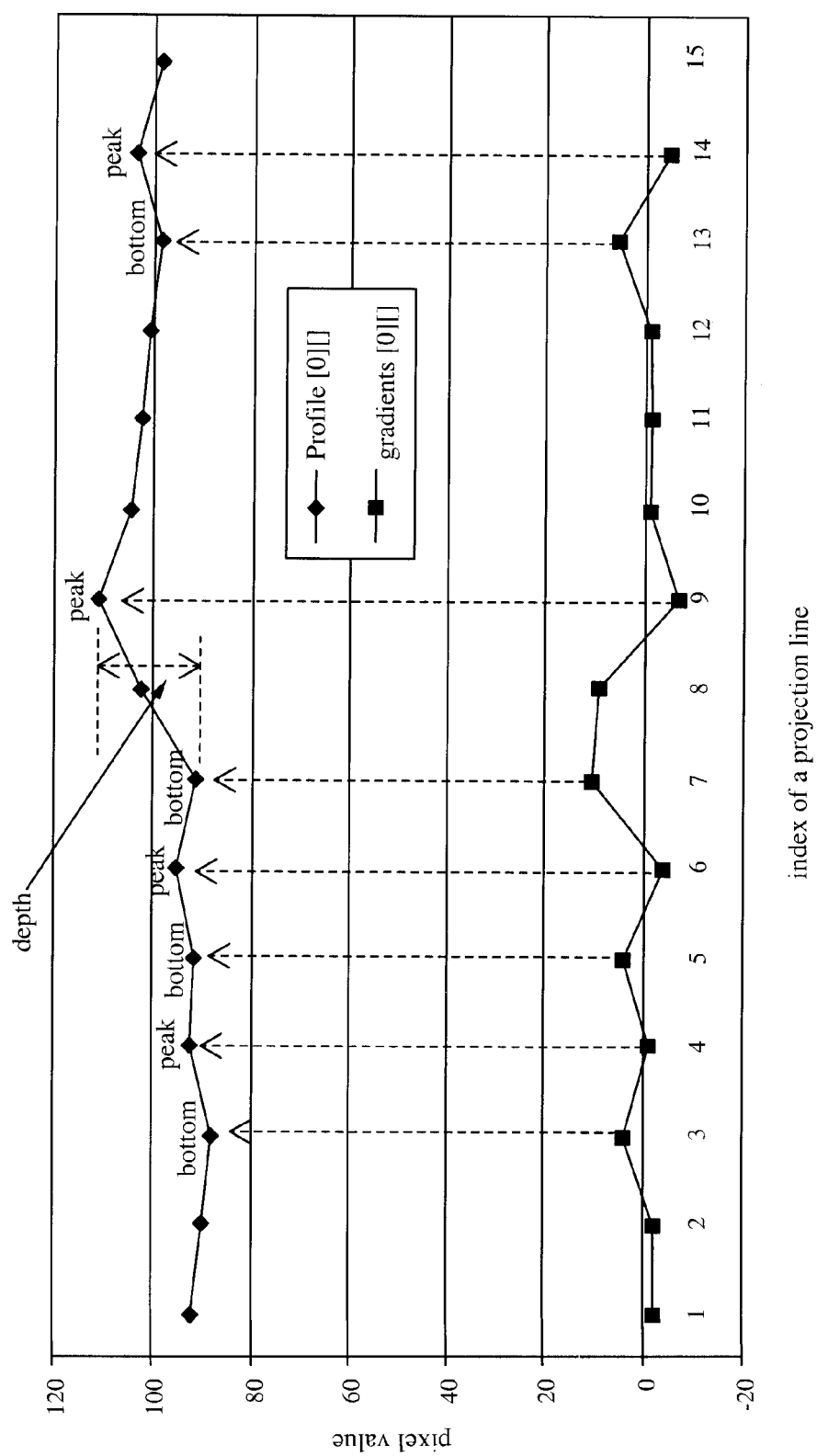
FIG. 5 illustrates a graph for analysis of a profile according to some embodiments.

The gradients (e.g. $1^{st}$ derivative) are calculated which are 92-90, 90-88, . . . , 103-98, and are shown as squares in FIG. 5. Zero-crossings of gradients are then found. The zero-crossing point is where a gradient changes its sign, either negative to positive or positive to negative. In FIG. 5, indices of projection line 3, 4, 5, 6, 7, 9, 13 and 14 are bottoms and peaks, turn by turn. Then, the depth of valleys are measured in a profile. In other words, the difference of either adjacent peak to bottom or bottom to peak is measured. For example, the depth between indices 7 and 9 is 20. It is determined if any of the 30 profiles for the input image segment meet pre-defined conditions, such as depths greater than 20 or the number of peaks and bottoms greater than 8. Other pre-defined conditions are able to be set as well. In some embodiments, the conditions are not pre-defined and are able to be varied depending on any number of factors. If any of the pre-defined conditions are met, then thin lines are detected. The detection of thin lines is able to be communicated appropriately to ensure the quality of the image remains high.

Figure 6:
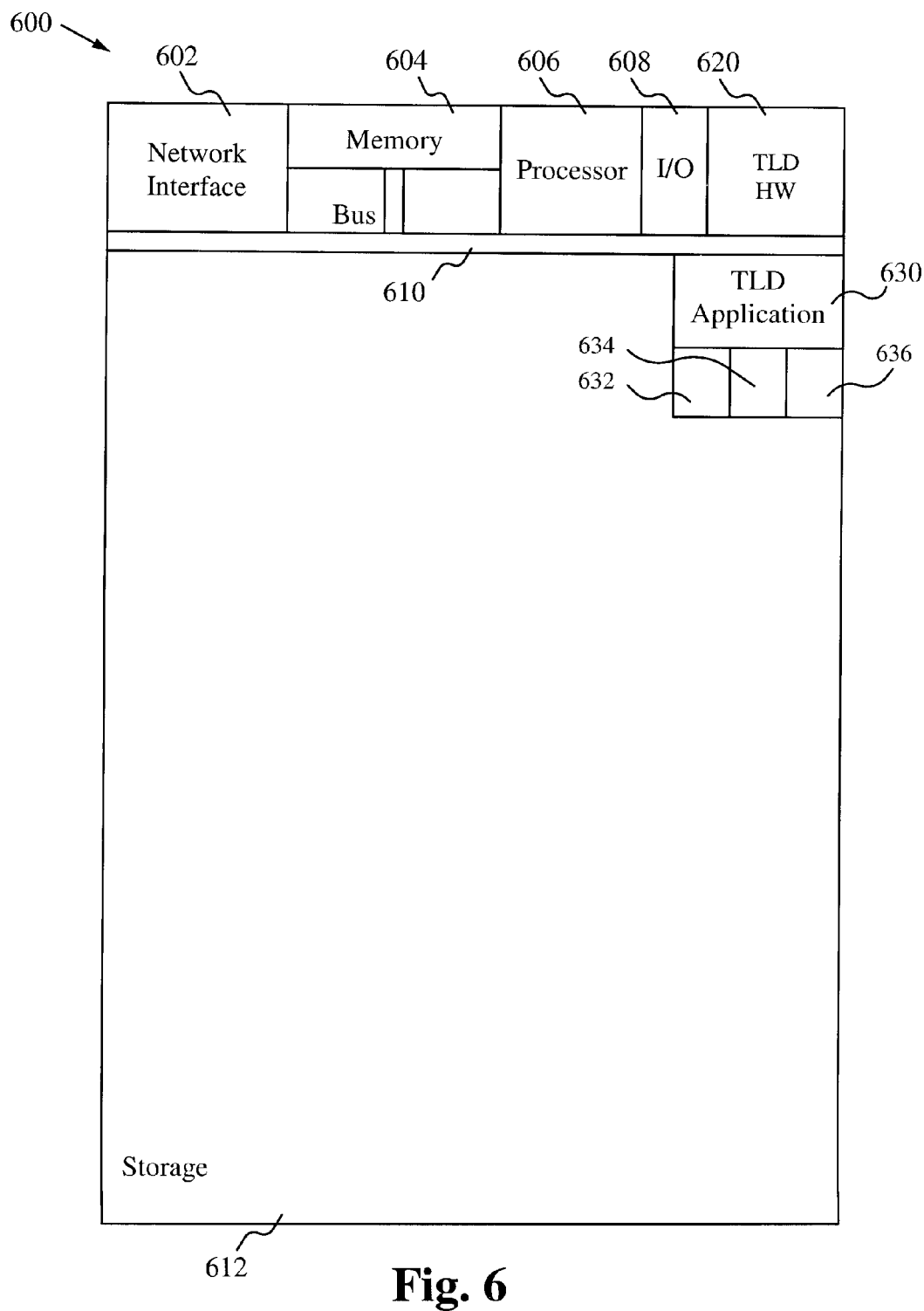
FIG. 6 illustrates a block diagram of an exemplary computing device configured to implement the thin line detection method according to some embodiments.

FIG. 6 illustrates a block diagram of an exemplary computing device 600 configured to implement the thin line detection method according to some embodiments. The computing device 600 is able to be used to acquire, store, compute, communicate and/or display information such as images and videos. For example, a computing device 600 is able to acquire and store an image. The thin line detection method is able to be used when encoding an image on the device 600. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. Thin line detection application(s) 630 used to perform the thin line detection method are likely to be stored in the storage device 612 and memory 604 and processed as applications are typically processed. More or less components shown in FIG. 6 are able to be included in the computing device 600. In some embodiments, thin line detection hardware 620 is included. Although the computing device 600 in FIG. 6 includes applications 630 and hardware 620 for thin line detection, the thin line detection method is able to be implemented on a computing device in hardware, firmware, software or any combination thereof.

In some embodiments, the thin line detection application(s) 630 include several applications and/or modules. In some embodiments, the thin line detection application(s) 630 include a profile generation module 632, a profile analysis module 634 and a decision module 636. The profile generation module 632 generates a profile. The profile analysis module 634 analyzes the profile. The decision module 636 makes a decision regarding the profile. In some embodiments, fewer or additional modules are able to be included. For example, in some embodiments, the profile analysis module and the decision module are combined into one module.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone®, a video player, a DVD writer/player, a television, a home entertainment system or any other suitable computing device.

To utilize the thin line detection method, a user acquires an image such as on a digital camera, and while the image is acquired and encoded, the thin line detection method automatically determines if thin lines are detected and then provides the appropriate bit rate for the portions of the image with the thin lines. The thin line detection method occurs automatically without user involvement.

In operation, the thin line detection method detects thin lines and utilizes varying bit rates when compressing an image based on the detection of thin lines in a portion of the image. If typically 100 bits are allocated for compressing a portion of the image, then 200 bits (or more) are able to be allocated when a portion of the image includes thin lines since quality loss is detected more easily by a viewer in an image segment that has thin lines in the same direction. Further, the projection-based thin line detection is able to detect thin lines with fewer computations than an edge-based detection. The thin line detection method enables better compression for images with less loss of quality using a less complex method than prior attempts.

Some Embodiments of Thin Line Detection

1. A method of detecting substantially parallel thin lines in an image implemented on a device comprising:
   a. generating a profile using a processor; and
   b. analyzing the profile using the processor to determine whether the thin lines exist.
2. The method of clause 1 wherein the profile is generated for each of a pre-defined plurality of directions.
3. The method of clause 2 wherein multiple projection lines are used for each direction of the plurality of directions.
4. The method of clause 3 further comprising determining a sum of the pixel values along the projection line and averaging the sum to generate a result for each projection line of the multiple projection lines.
5. The method of clause 4 wherein the result is stored in any one of an array, a linked list and a table.
6. The method of clause 4 wherein analyzing the profile further comprises computing gradients for each result and determining sign changes of the gradients.
7. The method of clause 4 wherein analyzing the profile further comprises computing gradients for each result and determining a difference value between each adjacent peak and bottom.
8. The method of clause 7 wherein if an amount of the sign changes is greater than a first threshold and if the difference value is greater than a second threshold, then the thin lines are determined to exist.
9. The method of clause 1 further comprising sending a decision to a rate controller which allocates additional bits for encoding the portion of the image when the thin lines are detected.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.
11. A method of encoding an image implemented on a device comprising:
    a. detecting substantially parallel lines in a portion of the image using a processor; and
    b. allocating additional bits when the substantially parallel lines are detected using the processor.

12. The method of clause 11 wherein detecting the lines further comprises:
   a. generating a profile for each of a pre-defined plurality of directions; wherein multiple projection lines are used for each direction of the plurality of directions;
   b. determining a sum of the pixel values along the projection line and averaging the sum to generate a result for each projection line of the multiple projection lines; and
   c. computing gradients for each result and determining sign changes of the gradients or determining a difference value between each adjacent peak and bottom, and if the difference value is greater than a first threshold, then the thin lines are determined to exist or if an amount of the sign changes is greater than a second threshold, the thin lines are determined to exist.
13. The method of clause 11 further comprising sending a decision to a rate controller which allocates the additional bits for encoding the portion of the image when the lines are detected.
14. The method of clause 12 wherein the result is stored in any one of an array, a linked list and a table.
15. The method of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.
16. A system for encoding an image programmed in a memory on a device comprising:
   a. a profile generation module for generating a profile for each of a pre-defined plurality of directions using a processor, wherein multiple projection lines are used for each direction of the plurality of directions;
   b. a profile analysis module for analyzing the profile by determining a sum of the pixel values along the projection line and averaging the sum to generate a result for each projection line of the multiple projection lines and computing gradients for each result and determining sign changes of the gradients and determining a difference value between each adjacent peak and bottom; and
   c. a decision module for deciding if the difference is greater than a first threshold, then thin lines are determined to exist or if an amount of the sign changes is greater than a second threshold, the thin lines are determined to exist.
17. The system of clause 16 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.
18. A device comprising:
   a. a memory for storing an application, the application for:
      i. generating a profile; and
      ii. analyzing the profile to determine whether the thin lines exist; and
   b. a processing component coupled to the memory, the processing component configured for processing the application.
19. The device of clause 18 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.
20. A camera device comprising:
   a. an image acquisition component for acquiring an image;
   b. a codec for encoding the image by:
      i. detecting substantially parallel thin lines in a portion of an image; and
      ii. allocating additional bits for the portion of the image when substantially parallel thin lines are detected when compressing the image into a compressed image; and
   c. a memory for storing the compressed image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of detecting substantially parallel thin lines in an image implemented on a device comprising:
   a. generating a profile using a processor;
   b. analyzing the profile using the processor to determine whether the thin lines exist, wherein the profile is generated for each of a pre-defined plurality of directions and multiple projection lines are used for each direction of the plurality of directions; and
   c. determining a sum of pixel values along a projection line and averaging the sum to generate a result for each projection line of the multiple projection lines.

2. The method of claim 1 wherein the result is stored in any one of an array, a linked list and a table.

3. The method of claim 1 wherein analyzing the profile further comprises computing gradients for each result and determining sign changes of the gradients.

4. The method of claim 1 wherein analyzing the profile further comprises computing gradients for each result and determining a difference value between each adjacent peak and bottom.

5. The method of claim 4 wherein if an amount of the sign changes is greater than a threshold and if the difference value is greater than a second threshold, then the thin lines are determined to exist.

6. The method of claim 1 further comprising sending a decision to a rate controller which allocates additional bits for encoding the portion of the image when the thin lines are detected.

7. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

8. A method of encoding an image implemented on a device comprising:

a. detecting substantially parallel lines in a portion of the image using a processor, wherein detecting the lines further comprises generating a profile for each of a pre-defined plurality of directions, wherein multiple projection lines are used for each direction of the plurality of directions and determining a sum of pixel values along a projection line and averaging the sum to generate a result for each projection line of the multiple projection lines; and b. allocating additional bits when the substantially parallel lines are detected using the processor.

9. The method of claim 8 wherein detecting the lines further comprises:

computing gradients for each result and determining sign changes of the gradients or determining a difference value between each adjacent peak and bottom, and if the difference value is greater than a first threshold, then the thin lines are determined to exist or if an amount of the sign changes is greater than a second threshold, the thin lines are determined to exist.

10. The method of claim 8 further comprising sending a decision to a rate controller which allocates the additional bits for encoding the portion of the image when the lines are detected.

11. The method of claim 9 wherein the result is stored in any one of an array, a linked list and a table.

12. The method of claim 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

13. A system for encoding an image programmed in a memory on a device comprising:

a. a profile generation module for generating a profile for each of a pre-defined plurality of directions using a processor, wherein multiple projection lines are used for each direction of the plurality of directions;

b. a profile analysis module for analyzing the profile by determining a sum of the pixel values along the projection line and averaging the sum to generate a result for each projection line of the multiple projection lines and computing gradients for each result and determining sign changes of the gradients and determining a difference value between each adjacent peak and bottom; and c. a decision module for deciding if the difference value is greater than a first threshold, then thin lines are determined to exist or if an amount of the sign changes is greater than a second threshold, the thin lines are determined to exist.

14. The system of claim 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

15. A device comprising:

a. a memory for storing an application, the application for:
 i. generating a profile;
 ii. analyzing the profile to determine whether the thin lines exist, wherein the profile is generated for each of a pre-defined plurality of directions and multiple projection lines are used for each direction of the plurality of directions; and
 iii. determining a sum of pixel values along a projection line and averaging the sum to generate a result for each projection line of the multiple projection lines; and b. a processing component coupled to the memory, the processing component configured for processing the application.

16. The device of claim 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone®, an iPod®, a video player, a DVD writer/player, a television and a home entertainment system.

17. A camera device comprising:

a. an image acquisition component for acquiring an image;
b. a codec for encoding the image by:
 i. detecting substantially parallel thin lines in a portion of an image, wherein detecting the lines further comprises generating a profile for each of a pre-defined plurality of directions, wherein multiple projection lines are used for each direction of the plurality of directions and determining a sum of pixel values along a projection line and averaging the sum to generate a result for each projection line of the multiple projection lines; and
 ii. allocating additional bits for the portion of the image when substantially parallel thin lines are detected when compressing the image into a compressed image; and c. a memory for storing the compressed image.

* * * * *